Dec. 28, 1954  J. A. MORTON  2,698,092
APPARATUS FOR FILTERING FRYING FAT
Filed Oct. 24, 1951  4 Sheets-Sheet 1

INVENTOR,
JAMES A. MORTON
BY
ATTORNEY

Dec. 28, 1954  J. A. MORTON  2,698,092
APPARATUS FOR FILTERING FRYING FAT
Filed Oct. 24, 1951  4 Sheets-Sheet 2
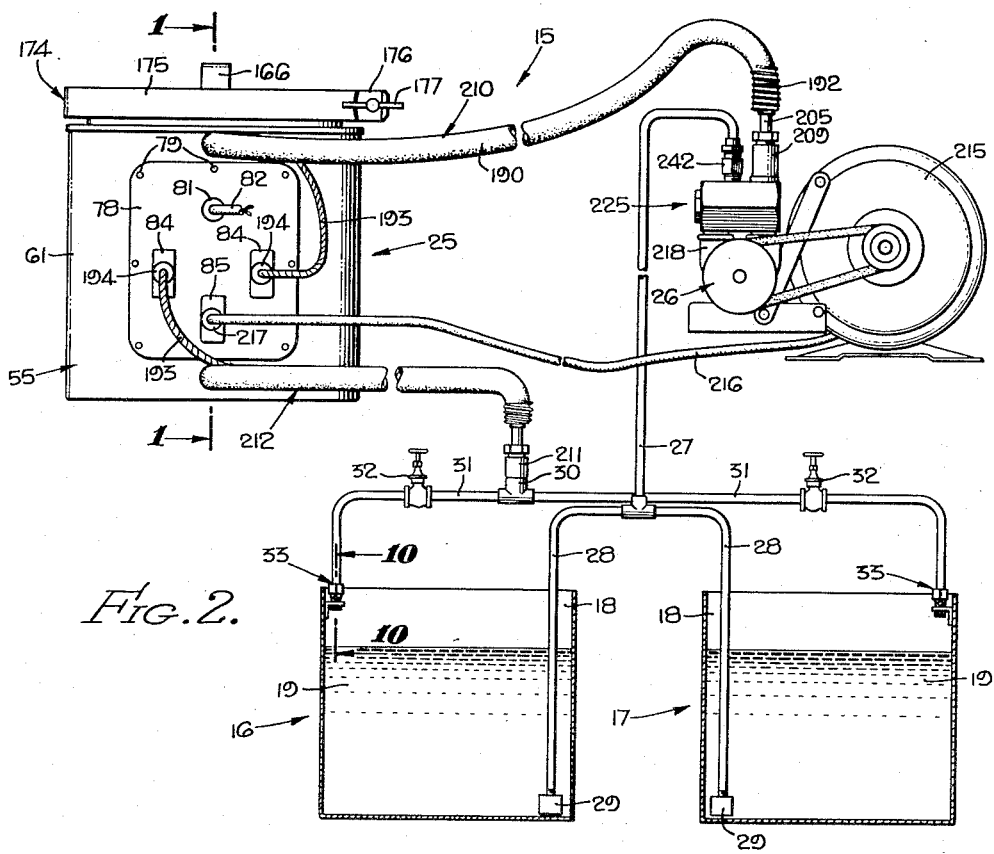

Dec. 28, 1954  J. A. MORTON  2,698,092
APPARATUS FOR FILTERING FRYING FAT
Filed Oct. 24, 1951  4 Sheets-Sheet 3

INVENTOR,
JAMES A. MORTON
BY
ATTORNEY

Dec. 28, 1954  J. A. MORTON  2,698,092
APPARATUS FOR FILTERING FRYING FAT
Filed Oct. 24, 1951  4 Sheets-Sheet 4
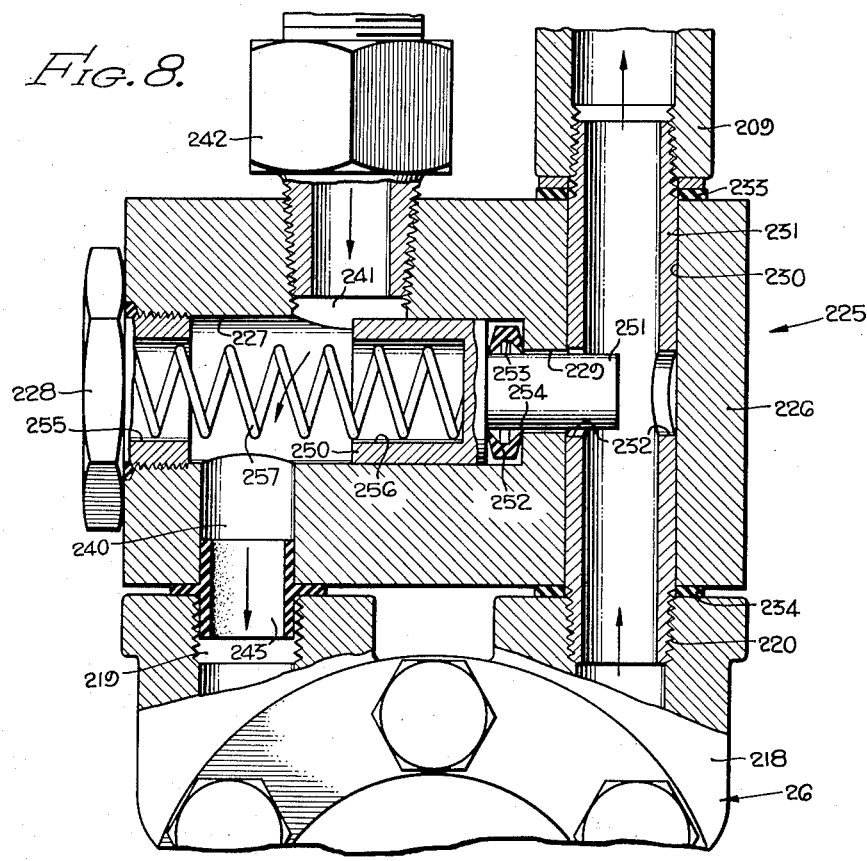
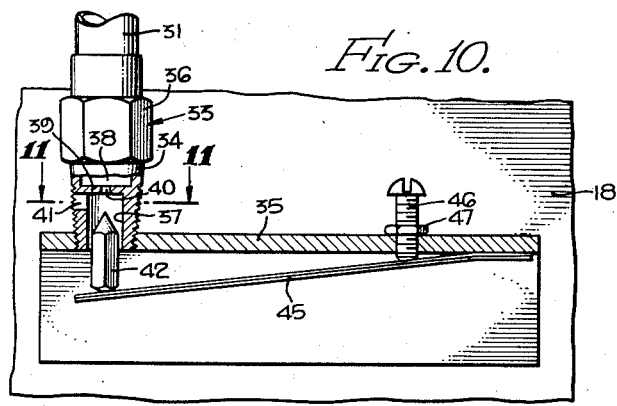
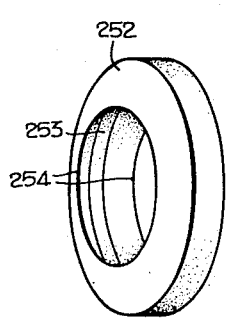
INVENTOR,
JAMES A. MORTON
BY
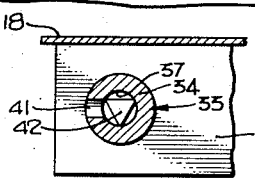
ATTORNEY

United States Patent Office 2,698,092
Patented Dec. 28, 1954

2,698,092

APPARATUS FOR FILTERING FRYING FAT

James A. Morton, Hermosa Beach, Calif., assignor to Frysweet Filter Corporation, Los Angeles, Calif., a corporation of California Application October 24, 1951, Serial No. 252,968

17 Claims. (Cl. 210—122.2)

This invention relates to the art of filtering frying fat to eliminate impurities and products of decomposition therefrom and is particularly applicable directly to the fat employed in deep fryers commonly used in restaurants and bakeries while these fryers are in actual use.

Large quantities of oils and fats are used in the commercial frying of such products as doughnuts, potato chips, nuts, etc., as well as in the preparation of a variety of fried foods in restaurants and hotels.

Commercial frying differs from that practiced in the household in that the products to be cooked are invariably "deep-fried," by immersion in a large body of fat, rather than being merely sauteed. Also, the large quantities of material passed through the fat make a constant replenishment of it necessary. Consequently, the contents of the frying kettle are inclined to consist of an equilibrium mixture of fresh fat with fat which has undergone an indefinite period of use.

For products which are fried in large quantities, such as doughnuts, the frying kettles are usually equipped with thermostatic controls, which maintain the fat at a constant temperature, and with fully automatic machinery, which continuously feeds the raw food into the kettle and withdraws and drains it after a predetermined cooking period.

The temperature employed in deep frying varies from about 325–350° F., in the frying of nuts or potato chips, to about 390° F. in doughnut frying. At these temperatures fats hydrolyze appreciably in the presence of water. As all of the foods which are commonly fried are more or less wet, fats used for frying exhibit a progressive increase in their content of peroxides and free fatty acids. Some polymerization also takes place during the frying operation, as is evidenced by a gradual accumulation of gummy material on the bottom or edge of the frying kettle.

Accumulations of products of decomposition and foreign matter introduced by the food in deep fryers gradually deepens the color of the fat and produces an increasingly strong odor which is eventually transmitted to the food being fried. This deterioration of the oil increases at such a rate that at the better restaurants it has heretofore been found necessary to drain the fat from the fryer and replace this with fresh fat every three to six days depending upon the extent to which the fryer has been used. This draining and cleaning of the frying kettle must be done while the fat is hot at the end of a day's run and the handling of this hot fat constitutes a considerable hazard to the employees and involves considerable labor.

It is an object of the present invention to provide a method of and apparatus for filtering frying fat which continuously removes from the frying fat in a deep fryer while the latter is in use, those products of decomposition which tend to produce an offensive odor and discolor the fat, and by which purification, the fat will be maintained in a relatively sweet and clear condition over a prolonged operation period without the necessity of changing the fat in the fryer.

Further objects of my invention are thus seen to be to effect substantial savings in the amounts of fats used in deep fryers, to assure a substantial uniformity in the product fried in said fryers, and to eliminate much of the hazard and labor involved in the frequent changes of frying fat in deep fryers incidental to the current practice in operating these.

As much of the fats used for deep frying solidify when allowed to cool, it has heretofore been necessary to restrict filtering operations to the batch process in which the oil is all drained from the fryer into the filter and, after being treated in the latter, is returned to the fryer.

A yet further object of the invention is to provide a filter as aforesaid which may be placed at any convenient location close to or remote from the deep fryer and which has within itself a means of liquifying solidified fat throughout the system for the purpose of recommencing operations at the beginning of each working day.

Yet another object of the invention is to provide a method of and apparatus for continuously filtering fats or oils in which the latter are constantly subjected to fresh filter aid.

A still further object of the invention is to provide such a method and apparatus with a simple means for feeding fresh filter aid from a confined body of the same at a uniform predetermined rate into a stream of fat or oil travelling through the filter, and subsequently removing said filter aid from said oil or fat before the latter is discharged from said filter.

Another object of the invention is to provide a filter as aforesaid which can be readily serviced by unskilled kitchen help without substantial hazard, for the removal of used filter aid therefrom, replenishing the filter with fresh filter aid and closing the filter again for resumption of operations.

It is also an object of the invention to provide a novel, electrically heated filter system having a circulating pump and hoses for connecting the filter of the invention to the pump and to a deep fryer and an automatic thermostatic control for said system which starts the pump for circulating liquid fat from said deep fryer to said filter and from the latter back to said deep fryer, whereby said pump is set in operation automatically upon the fat in said hoses and filter reaching a temperature where it is fluid.

The objects of the invention also include the provision of a thermostatically controlled division of the fat discharged from the filter between a plurality of frying kettles whereby an obstruction in the line leading to certain of said kettles may not cause the fat in another kettle to overflow.

This application is a continuation-in-part of the copending application of James A. Morton, Serial No. 151,391, filed March 23, 1950, on "Filter, Collector and System Therefor."

The manner of accomplishing the foregoing objects as well as further objects and advantages will be made manifest in the following description taken in connection with the accompanying drawings in which Fig. 1 is a diametral vertical sectional view taken on line 1—1 of Fig. 2 through a preferred embodiment of the filter of this invention, this view showing the same in substantially one-half its actual size.

Fig. 2 is a diagrammatic view of the entire apparatus of the invention shown as associated with the frying kettles of two deep fryers.

Fig. 3 is a fragmentary sectional view of one of the electrically heated hoses of the invention.

Fig. 4 is an enlarged cross-sectional view of the internal construction of one end portion of one of said hoses and is taken on the line 4—4 in Fig. 1.

Fig. 8 is an enlarged vertical sectional view of the improved automatic by-pass valve structure of the invention.

Fig. 9 is an enlarged perspective view of a seal ring employed in the structure illustrated in Fig. 8.

Fig. 10 is an enlarged fragmentary sectional view taken on the line 10—10 of Fig. 2 and illustrating one of the thermostatically operated return valves of the invention.

Fig. 11 is a detail sectional view taken on the line 11—11 of Fig. 10.

Figure 1:
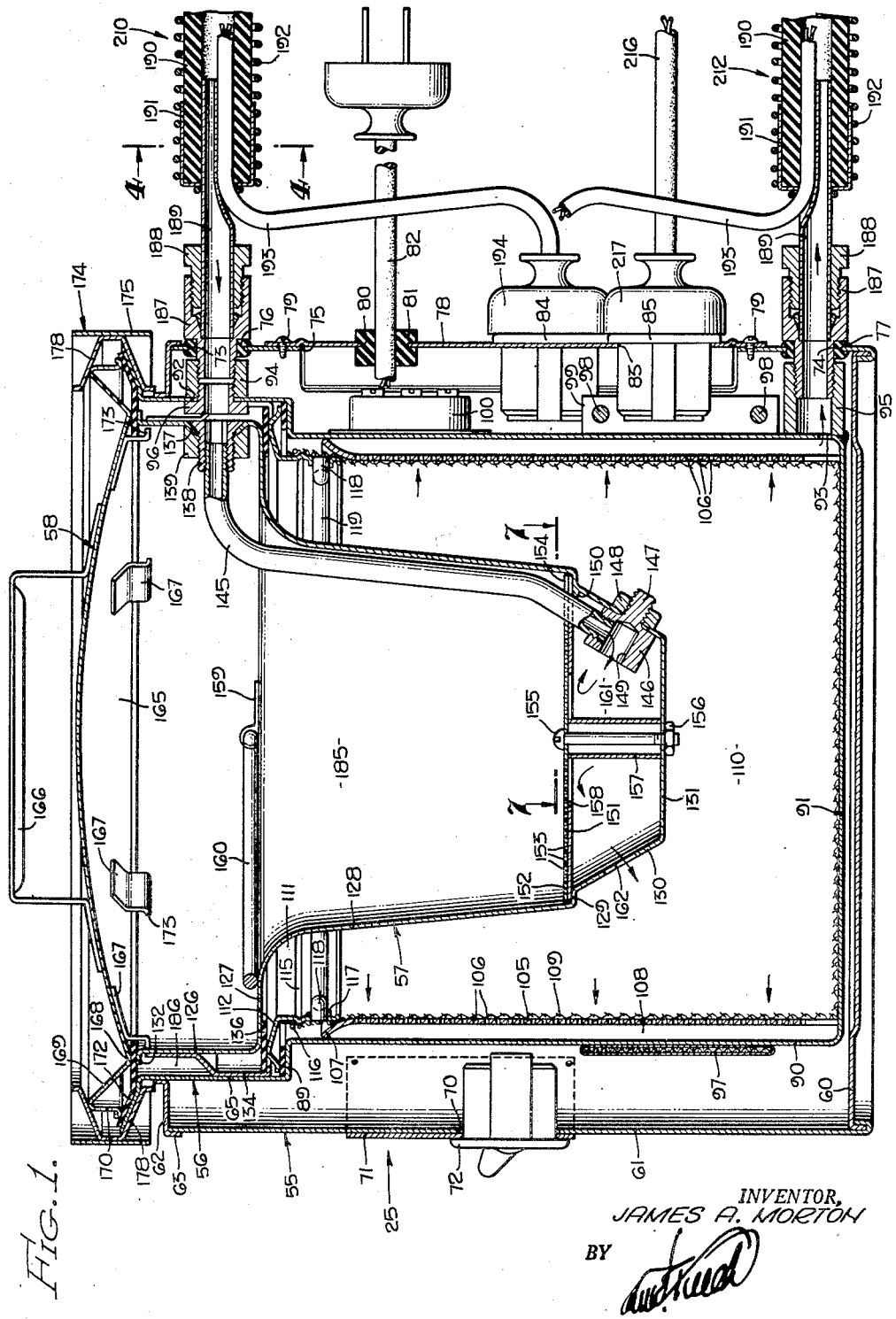

Referring specifically to the drawings and particularly to Fig. 2, the preferred embodiment of the apparatus 15 of my invention is here shown as associated with two deep fryers 16 and 17 having frying kettles 18 each of which contains a quantity 19 of hot frying fat.

The apparatus 15 includes a filter 25 and a motor driven pump 26 the latter being connected with the kettles 18 by a bifurcated suction line 27 having branches 28 which terminate respectively in strainers 29 located inside the kettles 18 near the bottoms thereof.

A pressure line T-fitting 30 is provided with two branches 31 having valves 32, each of said branches terminating at its lower end just inside of and close to one of the walls of one of the kettles 18 near the upper edge thereof, where these branches connect with thermostatically controlled valves 33.

Each of the valves 33 includes a tapered externally threaded body 34 which is screwed downwardly into a tapped hole provided in a bracket 35 secured to the inner face of the adjacent kettle wall. Each valve body 34 is connected at its upper end by a union 36 to one of the pressure branch lines 31. The body 34 has a lower bore 37 which extends upwardly from the lower end thereof and an upper bore 38 which communicates with the branch line 31, these bores being separated by a wall 39 having a restricting passage 40. The body 34 may also have one or more holes 41 opening laterally from the bore 37 at a level just beneath the wall 39.

Vertically slidable in bore 37 is a closure member 42 which is polygonal in cross-section (Fig. 11) so as to be accurately guided in concentric relation with the bore 37 by sliding engagement with the walls of said bore. Member 42 has a pointed upper end which fits into and closes the passage 40 when said member is lifted upwardly in the bore 37. The member 42 is held within the bore 37 as shown in Fig. 10 by a bi-metallic thermo-responsive arm 45 the opposite end of which is secured to the bottom of the bracket 35. Screwed downwardly through a suitable tapped hole in the bracket 35 is an adjustment screw 46 having a lock nut 47 by which the position of the member 42, when the major portion of the arm 45 is surrounded by atmosphere, is determined.

The arm 45 is constructed so that it will remain substantially as shown in Fig. 10 during normal operating conditions in the frying kettles 18 but in the event the amount of frying fat 19 in one of these kettles increases so that the arm 45 of the valve 33 in that kettle is submerged in the frying fat, this arm will bend upwardly lifting the member 42 and inserting the pointed upper end thereof into the passage 40 and thus temporarily prevent further flow of frying fat downwardly through passage 40 and into said frying kettle.

This will cause the level in said frying kettle to drop because frying fat will continue to be removed therefrom through one of the branch suction lines 28 without any fat being returned to said kettle through its valve 33, all of which will be made clear in the following description of the apparatus 15.

The filter 25 includes an outer housing 55 on which is supported a main container shell 56 which in turn supports a bucket 57, the upper ends of the shell 56 and bucket 57 being closed by a cover 58.

The housing 55 is cylindrical in shape and includes a sheet metal bottom 60, an annular side wall 61 and a ring cap 62 having a downwardly turned outer flange 63 which fits over and is secured to an upper edge portion of the wall 61 and an upwardly turned inner flange 64 inside of which an upper side wall portion 65 of the shell 56 snugly fits and is secured to as by spot welding 66.

Formed in the annular wall 61 of the housing 55 is an opening 70 which is covered by a plate 71 secured to the outer face of said wall and upon which is mounted a manual power switch 72. On the opposite side of the wall 61 from the opening 70 this wall has formed therein upper and lower holes 73 and 74 and a relatively large central hole 75. The holes 73 and 74 have synthetic rubber grommets 76 and 77 mounted therein while the opening 75 is normally covered by a removable plate 78 which is secured to the wall 61 by screws 79. The plate 78 has a hole 80, in which is mounted a synthetic rubber grommet 81 receiving an electric service cord 82, and three holes 83 in which two plug-in service outlet fixtures 84 and a third similar fixture 85 are mounted.

The container shell 56 has an annular flange 88 which extends outwardly and upwardly from the upper edge of the upper wall portion 65 of said shell. The shell 56 is bent inwardly at the lower edge of the wall portion 65 thereof to form a shoulder 89 which joins said lower edge with the upper edge of a lower side wall portion 90 of said shell, the lower edge of wall portion 90 being integral with a shell bottom 91.

The container shell 56 is imperforate except for a hole 92 formed in the wall portion 65 (Fig. 1) and a hole 93 formed in the same vertical radial plane with hole 92 but near the bottom 91. The holes 92 and 93 are respectively disposed in alignment with the grommets 76 and 77 and communicate with internally threaded sleeves 94 and 95 which are welded to outer faces of the container shell 56. Extending outwardly through the hole 92 and screwed into the sleeve 94 is a hex-headed nipple 96.

Clamped about the lower wall portion 90 of the shell 56 is a band-shaped electric heater 97, this being secured in place by bolts 98 extending through flanges 99 formed at opposite ends of said heater. Also secured to an upper portion of the outer face of lower wall portion 90 is a thermostatic switch 100.

Mounted within the shell 56 is a foraminous cylindrical screen 105 which is preferably formed of sheet metal having perforations 106, the lower edge of this screen snugly fitting the bottom 91 and the upper edge being flared outwardly to form a flange 107 which snugly engages the inner surface of the lower shell wall 90 so as to retain the screen 105 in uniformly spaced relation with said wall portion 90 to form an annular filtrate collecting space 108 between the shell wall portion 90 and the screen 105 this space communicating with the hole 93.

Figure 6:
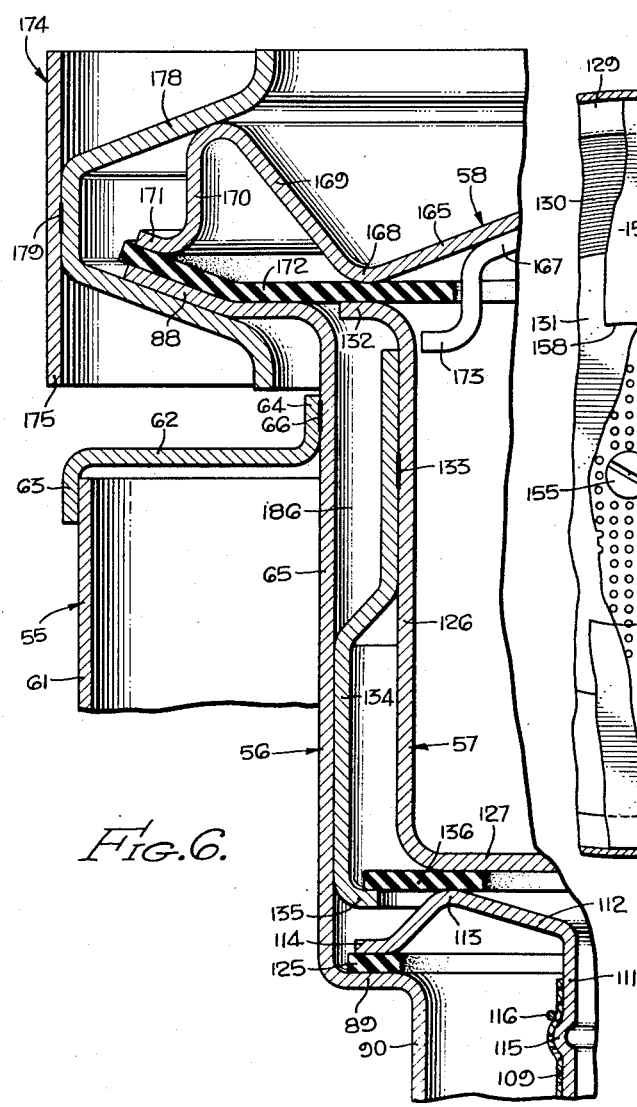
Fig. 6 is an enlarged fragmentary sectional view of a portion of Fig. 1 illustrating the seals employed between the several parts of the filter of the invention.

A filter bag 109 is provided which is preferably of spun glass and fits within the filtering chamber 110 formed by screen 105 and shell bottom 91. The upper mouth portion of said bag fits snugly around a neck 111 of an annular rim 112 which extends outwardly and upwardly from said neck to form an annular ridge 113 and then downwardly to form an annular radial sealing flange 114 (Fig. 6). The neck 111 has an outwardly extending annular ridge 115 over which the mouth of the bag 109 is placed after which a wire 116 is applied around said mouth above ridge 115 to secure said bag in place on the neck 111. Bearings 117 are formed at diametrically opposite points on the neck 111 for receiving trunnion ends 118 of a bail 119 which normally rests horizontally against a suitable stop on said neck to prevent it from swinging downwardly.

Resting on the shoulder 89 and spacing this from the annular flange 114 (Fig. 6) is an asbestos synthetic washer ring 125.

The bucket 57 is preferably spun out of a single sheet of metal to include an upper cylindrical wall 126, a horizontally inturned shoulder 127, a downwardly tapering bin wall 128, a short inturned shoulder 129 which connects with the upper edge of a more steeply tapered compartment side wall 130 the latter terminating at its lower edge in a horizontal bottom 131.

Formed outwardly from the upper edge of the cylindrical wall portion 126 is a sealing flange 132 (Figs. 1 and 6). Secured to the outer face of wall 126, as by spot welding 133, is an almost annular washer supporting apron 134, which properly centers the bucket 57 within the shell 56, an inturned flange 135 of said apron supporting an asbestos synthetic rubber washer 136.

Formed in the wall 126, by deforming the metal thereof inwardly, is a tapered boss 137 (Fig. 1) having a central opening through which an internally and externally threaded nipple 138 with a beveled head extends. A nut 139 with a beveled inner face is screwed onto said nipple to clamp the boss 137 between the head of said nipple and said nut. The nipple 138 has a hex-shaped internal conformation for the application of a wrench thereto. Before the nut 139 is thus tightened upon the nipple 138, the latter is screwed onto the horizontal upper thread of a pipe 145 which is bent so as to extend downwardly within the bucket 57 as shown in Fig. 1 with the threaded lower end of said tube screwed into a fitting 146 having a threaded stud 147 which extends through a suitable aperture provided therefor in the compartment side wall 130 and is secured in place by a nut 148 screwed onto said stud. A central hole 149 formed in said fitting coaxially with said stud communicates with the lower end of the tube 145 and opens upwardly at an angle of approximately 30 degrees with horizontal.

Figure 7:
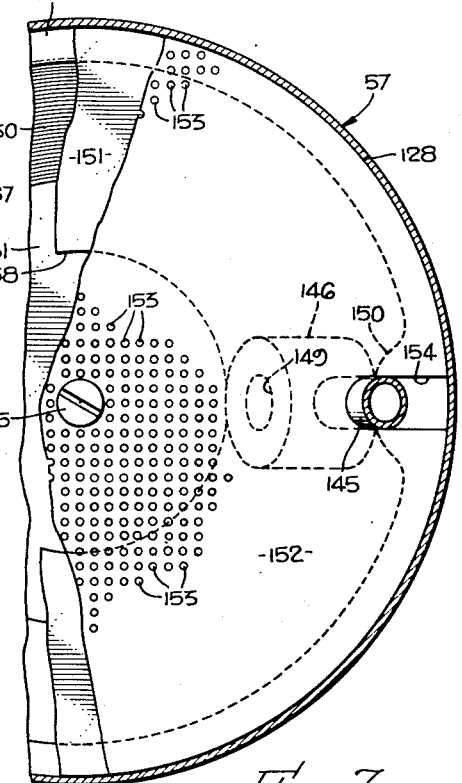
Fig. 7 is an enlarged fragmentary horizontal sectional view taken on the line 7—7 of Fig. 1.

Formed to extend inwardly from the upper edge of the tapered compartment wall 130 (Figs. 1 and 7), to form an inward extension of the shoulder 129, is a concave lug 150 which snugly fits an outer semi-cylindrical portion of the tube 145 in the horizontal plane of the shoulder 129 for a purpose to be made clear hereinafter.

The bucket 57 has a masking washer 151 of an outer diameter to fit within the lower portion of the tapered bucket wall 128 and rest upon the shoulder 129 and a disc 152 having perforations 153, which disc overlies the washer 151 and rests thereon, said washer and disc having notches 154 which fit snugly around the pipe 145. The washer 151 and disc 152 are held in place by a bolt 155 which extends downwardly through axially aligned holes in the disc 152 and the bucket bottom 131 below which it receives a nut 156, the tightening of which clamps a spacer tube 157 between the disc 152 and bucket bottom 131 and snugly assembles the washer 151 and disc 152 on the bucket 57. Thus all the disc holes 153 are closed excepting those located within the opening 158 provided in the washer 151.

Mounted at opposite points on the bucket shoulder 127 are bail bearings 159 in which opposite ends of a bail 160 are pivotally mounted.

Formed between the disc 152 and bucket bottom 131 is a mixing compartment 161 having an opening 162 formed in the wall 130.

The cover 58 is preferably formed of sheet metal as shown in Figs. 1 and 6, and includes a slightly arched dome 165 having a handle 166 welded thereon and gasket supporting lugs 167 welded on the lower face thereof just inwardly from a peripheral ridge 168 formed on said dome by bending the metal thereof upwardly to produce an outwardly and upwardly inclined annular wall 169 which terminates in a cylindrical downwardly extending wall 170 having a short flange 171 formed outwardly from the lower edge thereof (Fig. 6). An annular gasket 172 closely fits around the lugs 167 and over out-turned ends 173 thereof so as to be supported on the cover 58 when this is lifted from the filter.

To unite the elements of the filter 25 in assembled relation, a split clamp 174 is provided which includes an outer band 175 end portions 176 of which are adapted to be drawn together as by a manually operated toggle screw 177, and a V-shaped constricting member 178 which is secured by spot welding 179 to the band 175. When the clamp 174 is applied, as shown in Figs. 1 and 6, this holds the cover and bucket in tightly assembled relation with the container shell of the filter to form seals between these respective parts (Fig. 6) by compressing washer 125 between shoulder 89 and flange 114; by compressing washer 136 between ridge 113 and bucket shoulder 127; by compressing washer 172 between bucket flange 132 and cover ridge 168; and by compressing washer 172 between container shell flange 88 and cover flange 171. The formation of these seals produces within the filter 25 the following separate chambers; filtering chamber 110 which is disposed between the lower container seal wall 90 and the bucket 57; a filter aid bin 185; and an annular communication passage 186 located between the annular shell wall portion 65 and the upper bucket wall portion 126, which passage serves to connect the nipple 96 with the nipple 138 in the operation of the filter.

Extending through the grommet 76 and screwing into the sleeve 94 is a hose terminal receptacle 187, the latter being internally threaded to receive a gland 188 to connect a hose end tube 189 with said receptacle. The tube 189 extends into one end of a flexible hose 190, preferably formed of a temperature resisting synthetic rubber, the end of said hose being capped by a ferrule and wound with a coiled spring 192 to protect this hose from being bent too sharply adjacent the end thereof. (Figs. 1 and 4.) The tube 189 is deformed to admit a two-conductor rubber covered electrical cord 193 into the interior of hose 190, the cord 193 terminating at its outer end in a two-pronged plug 194.

The rubber covered cable 193 joins to one end of a hose heater 195 which includes a heat resistant flexible core 196 at the center of which is a single conductor wire 197, the core being wound with a heating element 198. At the connection between the cable 193 and the heater 195, one of the conductors of the cable connects to the central conductor 197 of the heater 195 and the other conductor connects to the heater element 198. At the opposite end of the heater 195 the heater element 198 is connected to the conductor 197 by a metallic cap 199.

The cap 199 is spaced from a metal hose end tube 205 which extends into the opposite end of the hose 190, the latter being bound by a ferrule 206 and wound with a coil spring 207. The tube 205 is provided with a gland 208 (Figs. 2 and 3) which secures this tube in a receptacle 209 (Figs. 2 and 9) provided therefor on pump 26 for a purpose which will be made clear hereinafter.

A flexible electrically heated fluid conduit 210 is thus seen to be provided which connects the sleeve 94 with the receptacle 209 on the pump 26. A receptacle 211 similar to receptacle 209 is provided on T-fitting 30 and a flexible internally heated conduit 212, which is identical to conduit 210, connects receptacle 211 with sleeve 95 (Fig. 1) and similar reference numerals are used to designate the elements of conduit 212 as are employed hereinabove in describing the conduit 210.

The pump 26 is driven by an electric motor 215 which is energized by an electric cord 216 which terminates in a plug 217 which is plugged into outlet 85 (Figs. 1 and 2).

Referring now to Fig. 8, the pump 26 is seen to have a body 218, with tapped holes 219 and 220 at the intake and discharge ends respectively of the pump. Associated with the pump 26 is a by-pass valve 225 in which a slide valve chamber 227 is formed, the outer end of which is closed by a screw cap 228 and the inner end of which terminates in a restricted opening 229 which communicates with a bore 230 slidably receiving a pipe 231 having holes 232 which are the same size as and are aligned with the opening 229 when the valve 225 is assembled. The upper and lower ends of the pipe 231 are threaded, the upper end screwing into the receptacle 209 and the lower end screwing into the threaded hole 220 in the pump body 218. Packing washers 233 and 234 are thus compressed between the receptacle 209 and the bodies 226 and 218 to produce fluid-tight seals between these elements.

Formed in the body 226 and aligned with the pump intake hole 219 is a valve intake passage 240, the upper end of which connects with the valve chamber 227. Off-set longitudinally of the chamber 227 from the passage 240 and also connecting with said chamber is a threaded valve inlet passage 241. Screwed into the passage 241 is an adaptor 242 through which the suction line 27 connects with said inlet passage.

In the assembly of the valve 225 with the pump 226 a rubber nipple gasket 243 is inserted into adjacent aligned ends of the hole 219 and intake passage 240 and compressed between the valve and pump bodies 226 and 218 so as to make a fluid-tight connection between hole 219 and passage 240.

Slidably mounted within the chamber 227 is a valve member 250 which is in the shape of a cylindrical cup having a cylindrical extension 251 formed axially thereon which extends through the opening 229 and whichever one of the holes 232 is disposed adjacent said opening. Surrounding the extension 251 is an annular flexible washer 252 having an annular internal channel 253 which forms internal flexible annular lips 254 which loosely fit over the extension 251. The washer 252 is assembled on the extension 251 so as to occupy the extreme right end of the chamber 227. Cap 228 has a bore 255 and the member 250 has a bore 256, a coiled expansion spring 257 being compressed between said cap and said valve member and extending into said bores.

Figure 5:
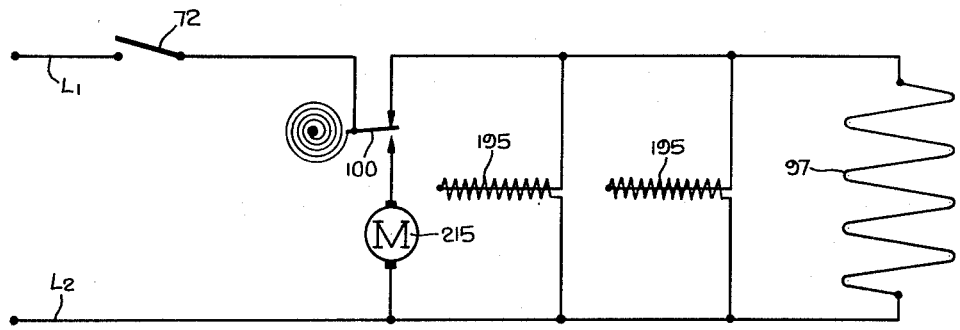
Fig. 5 is a wiring diagram of the electrical system of the invention.

The switch 72, the thermostatic control switch 100, the motor 215, the filter heater 97 and the hose heater 195 are connected together as shown in Fig. 5, to be energized from electric leads L1 and L2. When switch 72 is first turned on, with the apparatus cold, switch 100 is as shown in Fig. 5 thereby causing heaters 97 and 195 to be energized to liquify the solidified fat in the filter 25 and conduits 210 and 212. The switch 100 is preferably set to react to the temperature in the filter when this rises above 240° F. to de-energize the heaters 97 and 195 and energize the motor 215. When the temperature in the filter 25 drops below 190° F. the switch 100 turns off the motor and again energizes the heaters.

Operation

In preparation for performing the method of this invention the apparatus 15 is hooked up as shown in Fig. 2 and the filter 25 is charged with a quantity of powdered filter aid by removing the clamp 174 and the cover 58 and depositing the powdered filter aid in the storage bin 185 formed in bucket 57. This filter aid rests downwardly on the perforated disc 152. The cover 58 and clamp 174 are now replaced to effect the re-assembly of the filter 25 and the formation of annular seals as aforementioned which seal off the chambers 110, 185 and 186 from each other. Assuming that the apparatus 15 is being placed in use for the first time the frying kettles 16 and 17 are now provided with suitable quantities of frying fat, 30 lbs. of fat ordinarily constituting an initial charge for each kettle. The fat in these kettles is now heated by the heating devices with which these kettles are provided to a cooking temperature of from 250° F. to 400° F., depending upon the types of food to be cooked.

As this invention is provided to filter and purify the cooking fats in kettles 15 and 16 while these are in continuous operation, foods of various kinds to be fried are now dropped into the frying fat and either conveyed through this fat on a suitable conveyer (not shown), as when deep frying doughnuts, or these foods are dropped into the fat and attended by a cook who removes the food with a fork or basket after it is cooked to the desired degree.

The apparatus 15 is now energized by closing the switch 72 which, as above described, energizes the heaters 97 and 195 and rapidly heats the filter to a temperature of over 240° causing the switch 100 to be automatically actuated, thus de-energizing the heaters and energizing motor 215. This starts the pump 26 in operation, whereby frying fat is sucked inwardly through the screen boxes 29, the suction pipe legs 28 and the suction pipe 27 into the pump 26 from which it is discharged through the heated conduit 210 into the annular chamber 186. When this becomes filled with fat it produces, in effect, a direct flow of fat from the nipple 96 through the nipple 138 and pipe 145 to the fitting 146, from the bore 149 of which the fat is discharged upwardly at a slight angle against the bottom of that portion of the perforated disc 152 which is exposed by the hole 158 in the middle of the masking washer 151.

The washing of the hot liquid fat against the bottom face of the perforated disc 152 causes small jets of fat to flow upwardly through the perforations 153 in disc 152 so as to entrain particles of powdered filter aid which is thus washed downwardly through these holes with this fat, causing a continuous erosion of the powdered filter aid from the lower portion of the body thereof in the chamber 185. The filter aid thus removed from the main body thereof is, of course, in a fresh condition and has a relatively high adsorptive capacity and is highly active in removing any products of decomposition contained in the hot frying fat, such as free fatty acids and oxidation products which tend to impair the color and flavor of the fat.

A short time after the apparatus 15 has thus been placed in use, the mixing compartment 161 (Fig. 1) is filled with a mixture of liquid fat and filter aid which flows out of this compartment through hole 162 into filtering chamber 110. The latter is soon filled by this mixture of hot frying fat and filter aid up to the lower edge of the rim 112.

Full use is thus made of the filter bag 109 through which the fat passes and which removes therefrom the filter aid with which the fat was mixed as it enters the filter. The fat thus passing through the bag 109 collects in the annular space 108, fills this, and flows therefrom through the hole 93 (Fig. 1) and thence through flexible conduit 212 to the T-fitting 30 from which it is distributed through branch return lines 31 and valves 33 to the frying kettles 18.

As already pointed out, the valves 33 function so that if there should be any stoppage in one or the other of branch lines 31 causing an excessive proportion of the filtered frying fat to be returned to a particular one of the kettles 18, the rising of the level of frying fat in that kettle which would result from such stoppage would submerge the bi-metallic arm 45 of that valve causing it to close, thus forcing the returning fat to flow through the other return line 31 so as to clear out the stoppage therein and produce a resumption of normal equally divided flow through these lines and into the kettles 18.

To balance the normal rate of flow through the lines 31 or to cut one of the kettles 18 out of the system 15 when it is not being used for frying, valves 32 are provided.

In a normal operation, it is contemplated that the kettles 18 will remain in continuous operation throughout a working day which may include two or more shifts, at the end of which the heat will be turned off and the fat in the kettles 18 and apparatus 15 will be allowed to cool, as a consequence of which the fat will be congealed throughout the system when starting operations for the first shift of the following day.

All that it is necessary to do in order to start the apparatus 15 functioning properly at the start of the day is to close the switch 72 at the time the heat is turned on under the kettles 18. In about the same length of time that will be necessary to heat the fat 19 in the kettles 18 up to cooking temperature, the congealed fat in the conduits 210 and 212 and in the filter 25 will be heated to a temperature in excess of 240° F. which will result in the automatic turning off of the heaters in the apparatus 15 and the starting of pump 26 which will circulate the liquid fat from the kettles 18 through the apparatus 15 and back to said kettles.

No heater is provided in the pump 26 but such a small amount of congealed fat is present therein that the pump can readily handle this and as this fat is pumped into the heated conduit 210, it, of course, readily liquifies. In a similar manner, the amount of congealed fat in the suction line 27 is sucked into the pump 26 before this has been operating more than a short time so as to establish a ready flow of fluid fat throughout the system.

After the system 15 is shut down, the frying fat usually solidifies in the hoses in about a half an hour and in the filter 25 in about two hours. When starting at the beginning of a working day, the apparatus 15 warms up sufficiently for the switch 100 to start the motor 26 in approximately twenty minutes.

Where disposable paper filter bags are available such a bag may be used inside the glass cloth filter bag 109 so that when necessary to clean out the filter the accumulated used filter aid will all be confined within said paper bag so that to dispose of said filter aid after the filter has been disassembled and the cover 58 and bucket 57 removed therefrom, it will merely be necessary to swing the bail 119 upwardly and, by lifting on this, removes the bag rim 112 which will lift the glass cloth bag 109 from the filter with the used filter aid contained therein. By turning the rim 112 upside down, the used filter aid and disposable paper bag containing the same can now be dumped from the glass cloth bag 109 which will leave the latter clean and ready to be relined with a clean disposable bag.

To secure the upper end of such a disposable paper bag in place, the mouth of this need merely be slipped upwardly inside the mouth of the glass cloth filter bag and between this and the neck 111 of the rim 112. The upper end of the paper bag will thus be clamped between the lower edge of the neck 111 and the cloth bag 109 where this rests against the outwardly flared flange 107 of the filter screen 105. This also permits the upper end of the paper bag being readily removed from between the rim neck 111 and the cloth bag 109 when the latter has been lifted from the filter for cleaning the same.

The feeding of powdered filter aid through the holes 153 in the perforated disc 152 in the operation of the invention as above described is assisted by the development in the filter aid bin 185 of a super-atmospheric vapor pressure caused by the vaporizing of the water of crystallization of the filter aid contained in said bin. This pressure apparently is responsible for the exclusion of more than a slight amount of fat from the bin 185 so that this fat does not penetrate the main body of filter aid in said bin more than a short distance above the disc 152. Thus, the action of the hot fat on the powdered filter aid adjacent the disc 152 is to wash this downwardly through the perforations 153, where these are uncovered by the masking washer 151, into the fat circulating in the mixing compartment 161.

The speed at which powdered filter aid is fed from the bin 185 downwardly through the disc 152 depends upon the gravity of the fat being handled and the size of the holes 153. These holes vary in practice between a maximum where the holes have a diameter of $\frac{1}{16}$ of an inch with the holes on centers separated $\frac{7}{64}$ of an inch, and a minimum where the holes have a diameter of $\frac{1}{32}$ of an inch and are placed on centers spaced apart $\frac{3}{32}$ of an inch. Heavier fats such as beef suet are relatively slow in picking up the filter aid so that in handling this type of fat in the apparatus 15 it is preferable to use the maximum size of holes 153 and to use a masking washer 151 with a relatively large center opening 158 thus giving the heavier fat freer access to the filter aid resting against the perforated disc 152. Cottonseed oil is about the most liquid of frying fats in general use and the use of minimum size holes and a masking washer 151 with a relatively small center opening 158 have been found to allow an adequate washing of filter aid in the performance of the method of the invention.

Because of the provision of flexible heating elements in the conduits 210 and 212 there are no limitations as to the distance which the filter 25 may be placed from the frying kettles 18. Space limitations are thus seen to be no obstacle to the installation of the system 15 for use in conjunction with frying kettles already installed and operating in fairly close quarters, as the filter can be placed in the basement or elsewhere outside the kitchen where it may be conveniently serviced.

The present invention is adapted for use with any kind of frying fat and operates satisfactorily with almost any kind of activated filter clay or other form of powdered filter aid which is suitable for the original preparation of edible oils or fats.

While no heat insulation is shown in the filter 25 it is to be understood that the free space between the housing 55 and container shell 56 may be filled with insulating material which will prevent the dissipation of heat from the filter and thus lower the cost of operating the same.

In the actual commercial installations of the present invention it has been found possible when operating under identical conditions previously requiring the disposal of fat from the kettles, as aforesaid, after use for a relatively few days, to use the same continuously for as much as fourteen operating days before it becomes necessary to change the fat in the frying kettles.

The prolongation of the period during which the same frying fat may be used continuously has resulted in a great saving in the total amount of fat used in frying operations as well as decreasing the hazards of handling the hot oil when changing the same. Not only are the periods between changes greatly increased so as to decrease the number of times this must be done, but when it is found necessary to change the oil in the kettles 18, this may be accomplished merely by disconnecting the flexible conduit 210 from the filter 25, placing the discharge end of this conduit in a waste fat can and then close the switch 72 thus starting the motor 26 which will deliver practically all of the fat from the kettles 18 into said can.

Besides the foregoing advantages introduced by this invention, its use has resulted in the maintaining of a much higher quality in the frying fat which is reflected in the quality of the food fried therein, and in greatly decreasing the labor of keeping watch over the frying fat in the frying kettles to see that it has not deteriorated to a condition where it adversely affects the food being deep fried therein.

The claims are:

1. In an apparatus adapted to continuously filter hot fat, the combination of: a closed container; filter bag means in said container; said means covering the bottom and a substantial lower portion of the side walls of said container; a storage bin for powdered filter aid confined in an upper portion of said container, a filtering chamber being provided between said bin and said filter bag means, said bin having a foraminous bottom; means for sealing off said bin from communication with said chamber excepting through said foraminous bottom in said bin; means for conducting frying fat into intimate flowing contact with the foraminous bottom of said bin from beneath said bottom whereby the flow of said fat against said bottom causes relatively small portions of powdered filter aid contained in said bin to be released downwardly through said foraminous bottom and mixed with said fat, said fat then being discharged into said filter bag means which permits said fat to pass therethrough while retaining within said bag the filter aid and the products of deterioration adsorbed thereby; and means for withdrawing from the lower portion of said container the fat passing through said filter bag means as aforesaid.

2. A combination as in claim 1 in which a means is provided in said filter aid bin beneath the foraminous bottom thereof for forming a mixing compartment which confines the fat discharged against said foraminous bin bottom to cause a rapid circulation of said fat in said compartment so as to release portions of said filter aid downwardly through the openings of said foraminous bottom, there being a relatively small opening in said compartment forming means through which fat mixed with filter aid is discharged into said filter bag means.

3. A combination as in claim 1 in which said apparatus is associated with a deep fryer; a pump for pumping said fat from said deep fryer to said apparatus; means for heating said apparatus; means for conveying said fat from said deep fryer to said apparatus and back from said apparatus to said deep fryer; means for heating said conveying means and thermostatically controlled means for turning both of said heating means off when said conveying means and said apparatus have been heated to a temperature causing fat contained therein to readily flow, and simultaneously energizing said pump to cause the latter to circulate hot fat from said deep fryer to said apparatus and back to said deep fryer.

4. In an apparatus adapted to continuously filter the fat in a deep fryer, while the latter is in operation, the combination of: an outer vessel; filter bag means provided within said vessel to cover the bottom and a substantial portion of the side walls of said vessel, the space within said filter bag means comprising a filter chamber; means forming a storage bin for finely divided filter aid, said means covering said filter chamber and having an opening communicating therewith; a pump connected to said deep fryer to withdraw fat therefrom; a flexible tube for conveying fat from said pump to said vessel; conduit means for receiving said fat at the upper end of said vessel and conveying the same downwardly therein to discharge said fat to impinge upon and erode filter aid contained in said bucket and cause said filter aid to mix with said liquid and flow through said opening into said chamber; a flexible tube for conveying to said deep fryer filtered fat which has passed from said chamber through said filter bag means; an electric heater positioned for heating said vessel; flexible electric heaters disposed along said tubes for heating the same; and a thermostatic control means which automatically functions when said heaters have heated the fat in said flexible tubes and said vessel to where said fat will readily flow, to turn said heaters off and simultaneously turn on said pump to start the circulation of fat from said deep fryer to said vessel and back from said vessel to said deep fryer.

5. In a filter, the combination of: a double walled vessel, the outer wall being imperforate, the inner wall foraminous, with a filtered liquid collecting interwall space formed between said walls; a filtering fabric covering the openings in said inner wall; a bucket having an external flange at its upper end which rests downwardly on the upper end of said vessel and makes a sealed connection therewith, said bucket forming a storage bin for finely divided filter aid and having a foraminous bottom; means forming a sealed closure for the upper end of said bucket; primary conduit means for delivering liquid, to be filtered, in a continuous stream upwardly against the foraminous bottom of said bucket when the latter contains a quantity of said filter aid, to wash said filter aid downwardly through said foraminous bottom at a slow substantially uniform rate, said liquid mixing with said filter aid thus washed downward and being delivered into the space within said inner vessel wall so as to be filtered by said filtering fabric whereby the liquid is separated from said filter aid and allowed to pass through said inner vessel wall into said inter-wall space; and secondary conduit means connecting with said inter-wall space for conveying away filtered liquid.

6. A combination as in claim 5 in which the foraminous bottom of said bucket is a false bottom with the lower end of said bucket extending downwardly beneath said foraminous bottom to provide a filter aid and liquid mixing compartment into which said primary conduit means delivers liquid against said foraminous bottom, there being a drestricted opening leading from said compartment into the space between said bucket and said inner vessel wall.

7. A combination as in claim 6 in which said primary conduit means extends into an upper portion of said bucket and downwardly through said bin and said foraminous bucket bottom; and a fitting on the lower end of said primary conduit means which secures the same in place on said bucket and turns the stream of liquid delivered thereto by said primary conduit means upwardly against said foraminous bucket bottom.

8. A combination as in claim 7 in which said vessel has an upward extension above the aforesaid upper edge thereof on which said bucket rests and with which said bucket makes a sealed connection; means associated with said extension for holding downwardly said closure means for the upper end of said bucket to effect a seal between said closure means, said upper end of said bucket, and said upward extension of said vessel, while at the same time holding said bucket downwardly to render the aforesaid seal between said bucket and said vessel operative, an annular connecting space being thus sealed off between an upper portion of said bucket and the aforesaid upward extension of said vessel, said annular space forming a link in said primary conduit means; means for connecting the portion of said primary conduit means, which is disposed within said bucket, with said upper portion of said bucket to communicate with said annular space; and a third conduit means for connecting through said upward extension of said vessel with said annular enclosed space.

9. A combination as in claim 8 in which said filter fabric is in the form of a bag disposed within said vessel; and an annular rim about which said bag is secured, the lower end of said rim compressing said bag against a flared upper end of said inner vessel wall when said rim and bag are lowered into the upper end of said vessel, the aforementioned seal means between said bucket and said vessel comprising annular packing members disposed above and below said rim and compressed into sealing relation with said rim, said bucket and said vessel, when said filter is assembled as aforesaid.

10. A combination as in claim 5 in which the aforesaid foraminous bottom of said bucket is a false bottom which rests upon an inturned ledge formed on said bucket, said ledge continuing downwardly and inwardly to provide a liquid and filter aid mixing compartment into which said liquid is delivered, said compartment having an opening for the discharge of said mixture therefrom; and an annular masking washer resting on said ledge beneath said foraminous bottom, said masking washer exposing a pre-determined portion of the openings in said foraminous bottom and offering means for selectively determining the rate at which filter aid is washed through said foraminous openings for mixture with said liquid as aforesaid.

11. In a system for filtering liquid frying fat drawn from two deep fryer kettles and returning said liquid after it is filtered, to said kettles, the combination of: a pump; a filter; a bifurcated intake conduit taking in liquid from near the bottoms of said two tanks and delivering same to the intake end of said pump; a primary conduit connecting the discharge of said pump with said filter; a secondary conduit connecting the discharge end of said filter with a bifurcated return pipe the two branches of which terminate within the upper ends of said kettles and downwardly therein a short distance and are disposed so that the ends of said secondary conduit branches are spaced above the normal level of frying fat in said tanks; and thermostatic valves on lower ends of said secondary conduit branches, said valves being set so that when the frying fat in either of said kettles rises a substantial distance above the normal level of fat in said kettles the fat engages the thermostatic element of the valve associated with said kettle and actuates this to impede the flow of frying fat from the pipe branch emptying into said kettle thereby causing a decreasing portion of the frying fat discharged from said filter to be delivered to said last mentioned kettle and an increasing portion of said frying fat to be delivered to the other of said kettles.

12. In a filtering apparatus, the combination of; an outer vessel comprising a bottom and side walls and open at the top; an annular perforated strainer wall provided concentrically in said vessel and spaced a small distance inwardly from said vessel side wall to provide an annular filtered-liquid space between said side wall and said strainer wall; a filter bag within said strainer wall and open at its upper end and conforming substantially to inner surfaces of said vessel bottom and strainer wall to form a filtering chamber equal in depth to said bag, said bag entirely covering the perforations in said perforated wall; a bucket open at the top and forming a storage bin for powdered filter aid; means for mounting said bucket on the upper end of said vessel so as to form a closure for the upper end of said chamber; means for closing the upper end of said bucket; primary conduit means for conducting a continuous stream of liquid from a point above the upper end of said bag and for discharging the same into contact with said filter aid at a low point in said bucket to erode small amounts of said filter aid from the mass thereof in said bucket and cause said amounts of filter aid to be suspended in said liquid after which the latter is discharged into said chamber; and secondary conduit means for withdrawing filtered liquid from the annular space aforesaid provided for receiving the same after said liquid has passed outwardly through said bag.

13. A combination as in claim 12 in which said bucket extends downwardly a substantial distance into said chamber below the upper end of said bag whereby the space between said bag and said bucket for accommodating liquid discharged into said chamber has a U-shaped vertical cross-section.

14. A combination as in claim 13 in which a radial opening is formed in an upper portion of the wall of said bucket with which opening the upper end of said primary conduit means connects; means including said upper portion of said bucket side wall, a corresponding upper portion of said vessel side wall, and seals for sealing the space between said wall portions, both above and below said opening, to form an annular liquid transmission space; and a third conduit means in said upper portion of the side wall of said vessel for delivering liquid into said transmission space, said liquid passing therefrom through said opening and into said primary conduit means.

15. A combination as in claim 12 in which means is provided for making a tight connection between the upper end of the filter bag and said vessel side wall said means comprising a ring to which the upper end of said bag is secured, and a seal disposed between said ring and said vessel side wall.

16. A combination as in claim 12 in which means is provided for making a tight connection between the upper end of said filter bag and said vessel side wall, said means comprising a ring on which the upper end of said filter bag is attached, in which the upper edge portion of said strainer wall is flared outwardly to close the upper end of said annular filtered-liquid space, and in which said ring compresses said bag against said flared portion of said strainer wall to form a close fit between said bag and said strainer wall.

17. A combination as in claim 12 in which means is provided for making a tight connection between the upper end of said filter bag and the upper end of said strainer wall, said means comprising a ring on which the upper end of said filter bag is mounted; and a bail provided on said ring which may be folded into the radial plane thereof or swung upwardly for handling said bag when inserting the bag into or removing the bag from said vessel, while said bucket is removed from its position supported on said vessel.

References Cited in the file of this patent

UNITED STATES PATENTS

| Number | Name | Date |
|---|---|---|
| 1,234,131 | Cleveland | July 24, 1917 |
| 1,567,989 | Apablasa | Dec. 29, 1925 |
| 1,905,343 | Carpenter | Apr. 25, 1933 |
| 2,089,775 | Matthews | July 20, 1937 |
| 2,179,468 | Delf | Nov. 7, 1939 |
| 2,482,302 | Summers | Sept. 20, 1949 |
| 2,487,575 | Mercier | Nov. 8, 1949 |
| 2,545,712 | Stevenson | Mar. 20, 1951 |
| 2,621,156 | Farrell | Dec. 9, 1952 |